US008718806B2

(12) United States Patent
Warren

(10) Patent No.: US 8,718,806 B2
(45) Date of Patent: May 6, 2014

(54) SLAVE MODE TRANSMIT WITH ZERO DELAY FOR AUDIO INTERFACE

(75) Inventor: David S. Warren, Campbell, CA (US)

(73) Assignee: Apple Inc., Cupertino, CA (US)

( * ) Notice: Subject to any disclaimer, the term of this patent is extended or adjusted under 35 U.S.C. 154(b) by 462 days.

(21) Appl. No.: 13/224,439

(22) Filed: Sep. 2, 2011

(65) Prior Publication Data

US 2013/0060363 A1    Mar. 7, 2013

(51) Int. Cl.
| G06F 17/00 | (2006.01) |
| G06F 3/00 | (2006.01) |
| G06F 5/00 | (2006.01) |
| G06F 13/00 | (2006.01) |
| G06F 15/16 | (2006.01) |
| G06F 13/16 | (2006.01) |
| G06F 13/40 | (2006.01) |
| H04L 1/18 | (2006.01) |

(52) U.S. Cl.
CPC ........ G06F 13/1689 (2013.01); G06F 13/4045 (2013.01); H04L 1/1874 (2013.01)
USPC ................ 700/94; 710/52; 710/110; 709/236

(58) Field of Classification Search
CPC ............ G06F 13/1673; G06F 13/1689; G06F 13/287; G06F 13/4054; H04L 49/9021; H04L 49/9026; H04L 49/9031; H04L 49/9036; H04L 12/40058; H04L 1/1874; G10H 1/0058
USPC ......... 700/94; 711/109; 710/51, 52, 110, 105, 710/118, 308; 709/232, 236
See application file for complete search history.

(56) References Cited

U.S. PATENT DOCUMENTS

| 4,769,809 A | 9/1988 | Krick |
| 4,829,473 A | 5/1989 | Keller |
| 4,896,316 A | 1/1990 | Lespagnol et al. |

(Continued)

FOREIGN PATENT DOCUMENTS

| EP | 1903447 | 3/2008 |
| JP | 2003233584 | 8/2003 |
| JP | 2005274306 | 10/2005 |
| WO | 2009045904 | 4/2009 |

OTHER PUBLICATIONS

Philips Semiconductors, "I2S Bus Specification", Jun. 1996, Philips Semiconductors, all pages.*

(Continued)

*Primary Examiner* — Jesse Elbin
(74) *Attorney, Agent, or Firm* — Lawrence J. Merkel; Erik A. Heter

(57) ABSTRACT

An apparatus includes a first unit and a second functional units operating in a master-slave configuration. The first and second functional units operate as a master and slave, respectively. The first functional unit conveys clock and framing signals to the second functional unit. The second functional unit includes a buffer and a multiplexer having inputs coupled to the buffer. Digital audio data may be prefetched into the buffer. When a controller of the second functional unit detects assertion of the framing signal, it may cause a change of state to a selection signal provided to the multiplexer. Responsive thereto, the multiplexer selects an input coupled to receive, from the buffer, a next frame of data to be transmitted. A first bit of the frame is transmitted to the first functional unit on the same clock cycle in which assertion of the framing signal was detected.

23 Claims, 5 Drawing Sheets

(56) References Cited

U.S. PATENT DOCUMENTS

| | | | |
|---|---|---|---|
| 5,717,154 A | 2/1998 | Gulick | |
| 6,067,267 A | 5/2000 | Lo | |
| 6,347,344 B1 | 2/2002 | Baker | |
| 6,618,095 B1 | 9/2003 | Takeuchi et al. | |
| 7,489,362 B2 * | 2/2009 | Baer et al. | 348/554 |
| 7,519,728 B1 * | 4/2009 | Yeluri et al. | 709/234 |
| 7,706,415 B2 | 4/2010 | Varma et al. | |
| 2004/0146034 A1 * | 7/2004 | Chou et al. | 370/338 |
| 2006/0009985 A1 | 1/2006 | Ko et al. | |
| 2006/0174032 A1 | 8/2006 | Winchester et al. | |
| 2009/0055005 A1 * | 2/2009 | Oxman et al. | 700/94 |

OTHER PUBLICATIONS

European Search Report and Written Opinion in application No. 12181944.5 mailed Aug. 13 2013 pp. 1-5.

Office Action from Japanese Patent Application No. 2012-206234, mailed Jul. 30, 2013, (English Translation), pp. 1-4.

International Search Report and Written Opinion in application No. PCT/US12/51526 mailed Oct. 23, 2012.

* cited by examiner

SLAVE MODE TRANSMIT WITH ZERO DELAY FOR AUDIO INTERFACE

BACKGROUND

1. Field of the Invention

This invention relates to digital systems, and more particularly, the transmission of audio information in digital systems.

2. Description of the Related Art

In recent years, the number of available devices utilizing digital audio has increased dramatically. Such devices include smart phones, portable music players, tablet computers, and laptop computers, among others. To this end, bus and interface standards for integrated circuits (ICs) that transmit and received digital audio signals (either within or in conjunction with other devices) have been employed.

One such bus is the $I^2S$ (Inter-IC Sound) bus, which is a serial bus for coupling digital audio devices to one another. Another type of bus is the Multi-Channel audio (MCA) bus, the development of which was influenced by the $I^2S$ bus and pulse code modulation (PCM), the latter of which to digitally represent sampled analog signals.

The MCA bus standard includes signal connections for framing signals, a clock signal, and data signals. Furthermore, the MCA bus standard includes various modes in which devices designated as masters and slaves can exchange data with each other. In one particular mode, a master device may transmit a framing signal and a clock signal to a slave mode, which may then respond by transmitting data back to the master.

SUMMARY

A method and apparatus for a zero delay slave transmit mode is disclosed. In one embodiment, an apparatus includes a first functional unit and a second functional unit operating in a master-slave configuration, with the first functional unit operating as the master and the second functional unit operating as the slave. The first functional unit may convey clock and framing signals to the second functional unit. The second functional unit may include a buffer and a multiplexer having first and second inputs coupled to the buffer. Digital audio data may be prefetched into the buffer. When a controller of the second functional unit detects assertion of the framing signal, it may cause a change of state to a selection signal provided to the multiplexer. Responsive to the change of state of the selection signal, the multiplexer may select an input coupled to a buffer location corresponding to a next frame of data to be transmitted. A first bit of the frame may be transmitted on the same clock cycle in which assertion of the framing signal was detected.

In one embodiment, a method includes a master unit conveying clock and framing signals to a slave unit. The slave unit may include a buffer into which frames of digital audio data are prefetched. The slave unit may further include a multiplexer having multiple inputs coupled to receive data from the buffer. The method further includes the slave unit detecting assertion of the framing signal. Responsive to detecting assertion of the framing signal, the multiplexer may select an input thereof that is coupled to receive at least a first bit of the next frame of data to be transmitted. The first bit of the next frame of data may be transmitted from the multiplexer to the master unit during the same cycle of the clock signal in which assertion of the framing signal was detected.

In various embodiments, a first functional unit (e.g., an audio interface unit) may be coupled to a second functional unit (e.g., a memory controller coupled to a memory storing digital audio data) by a bus. The bus may include a first signal line for conveying a clock signal, a second signal line for conveying a framing signal, and a third signal line for conveying data. Data may be transferred serially between the first and second functional units. Moreover, the data may be transferred in frames, beginning with a most significant bit. Each frame may include audio data corresponding to an audio channel. In one embodiment, the second functional unit, operating as a slave, may consecutively transmit a first frame of audio data corresponding to a first audio channel followed by a second frame of audio data corresponding to a next audio channel.

BRIEF DESCRIPTION OF THE DRAWINGS

The following detailed description makes reference to the accompanying drawings, which are now briefly described.

Figure 1:
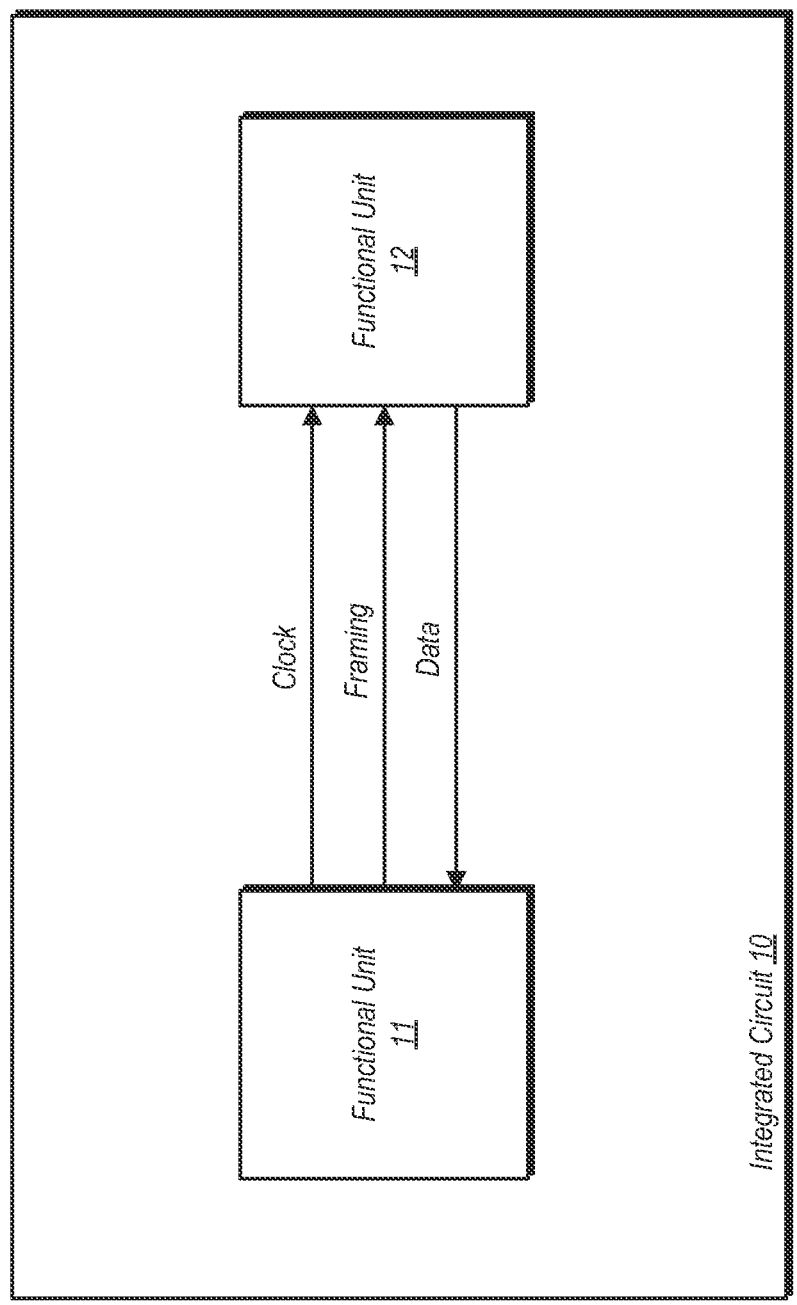
FIG. 1 is a block diagram of one embodiment of an integrated circuit (IC) including a first functional unit configured to operate as a master and a second functional unit configured to operate as a slave.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Integrated Circuit Embodiments:

FIG. 1 is a simplified block diagram of one embodiment of an integrated circuit (IC). In the embodiment shown, IC 10 includes a first functional unit 11 and a second functional unit 12. The two functional units are coupled by a bus having three separate interconnections. A first interconnection is used to convey a clock signal from functional unit 11 to functional unit 12. A second interconnection is used to convey a framing signal (requesting the transmission of a next frame of data) from functional unit 11 to functional unit 12. The third interconnection is used to convey data, serially, from functional unit 12 to functional unit 11.

The arrangement illustrated here is a master-slave configuration, with functional unit 11 acting as a master and functional unit 12 acting as a slave. Other modes of operation are possible and contemplated wherein functional unit 12 operates as a master and functional unit 11 operates as a slave (with the clock and framing signals being conveyed to functional unit 11 from functional unit 12). Furthermore, regardless of which functional unit is acting as a master and which is acting as a slave, the data interconnection may be bi-directional. Thus, functional unit 11, operating as a master, may be able to convey data to functional unit 12 in some operational modes.

Figure 2:
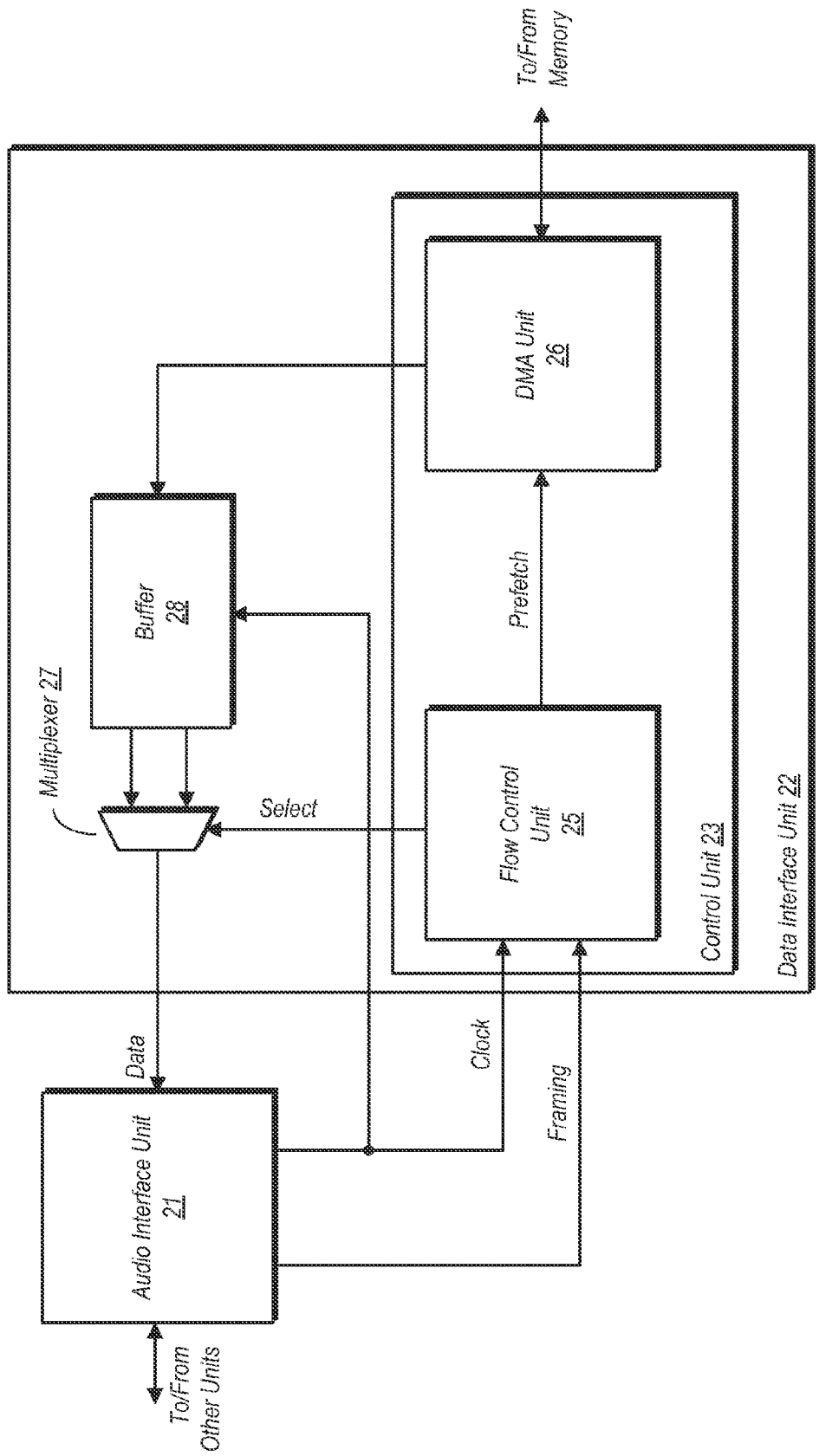
FIG. 2 is a block diagram of one embodiment of an IC including an audio interface.

Turning now to FIG. 2, a block diagram of one embodiment of an IC including an audio interface is shown. In the embodiment shown, audio interface unit 21 may function as a master, while data interface unit may function as a slave in a master-slave configuration. Moreover, audio interface unit 21 is coupled to convey clock and framing signals to data interface unit 22, while the latter is coupled to serially convey data to the former. As will be explained below, one of the modes in which the master-slave configuration shown here can operate is a zero-delay slave transmit mode, in which data is transmitted without delay (relative to cycles of the clock signal) upon detection of an asserted framing signal.

In the embodiment shown, data interface unit 22 includes a control unit 23, a multiplexer 27, and a buffer 28. Control unit 23 includes a flow control unit 25 and a direct memory access (DMA) unit 26. Flow control unit 25 is coupled to receive the clock and framing signals from audio interface unit 21. Furthermore, flow control unit 25 is configured to assert and convey a prefetch signal, which may be received by DMA unit 26. Responsive to receiving an asserted prefetch signal, DMA unit 26 may prefetch digital audio data from a memory coupled thereto. In this embodiment, the digital audio data may be organized into frames that may be serially transmitted (although the frames may be transmitted back to DMA unit 26 in parallel). The frames of data retrieved by DMA unit 26 may be stored into buffer 28.

In one embodiment, buffer 28 may be a first-in, first-out memory, and may include a number of unique storage locations. Buffer 28 also includes two separate outputs through which data may be serially provided. Accordingly, buffer 28 may be arranged to serially output the oldest frame of data stored therein through one of the two separate outputs. In one embodiment, two different read pointers may alternate pointing to the oldest data stored in buffer 28.

In the embodiment shown, multiplexer 27 may be an asynchronous (e.g., analog) multiplexer. Flow control unit 25 may, responsive to detection of an asserted framing signal, toggle (i.e., change a state of) the select signal provided to multiplexer 27. Buffer 28 may be coupled to multiplexer 27 such that each time the select signal is toggled, the buffer output associated with the oldest data in buffer 28 is selected as the multiplexer input. This data may be conveyed serially through multiplexer 27 to the data interconnection, beginning with the first bit of the frame.

As noted above, the master-slave configuration shown in FIG. 2 may operate in a zero-delay slave transmit mode. Operation in this mode may be enabled in part by the prefetching of digital audio data and storing frames thereof into buffer 28. DMA unit 26 may prefetch frames of digital audio data in an intended transmission sequence, and store the frames into buffer 28. Audio interface unit 21 may convey the clock signal (which may be internally or externally generated by a clock source) to buffer 28 and flow control unit 25. When audio interface unit 21 is ready to receive a next frame of data, it may assert the framing signal. Responsive to detecting the assertion of the framing signal, flow control unit 25 may toggle the select signal provided to multiplexer 27. Responsive to the toggling of the select signal, multiplexer 27 may select as an input the output of buffer 28 that corresponds to the oldest data frame stored therein. A first bit of the data frame may be conveyed from multiplexer 27 during the same cycle of the clock signal in which the assertion of the framing signal is detected. Accordingly, instead of delaying the transmission of the first bit of the frame by a clock cycle, the first bit is instead transmitted with a delay of zero clock cycles. The remaining bits of the frame of digital audio data may be serially transmitted during subsequent cycles of the clock signals. After all bits of the frame have been transmitted, audio interface unit 21 may again assert the framing signal, thereby starting the same process for the next frame of data.

Data received by audio interface unit 21 may be conveyed to other functional units to which it is coupled. For example, one embodiment of audio interface unit 21 may include a digital-to-analog converter that may convert the received data to an analog format before being transferred to an amplifier, and ultimately, a speaker. In another embodiment, audio interface unit 21 may transmit the received data on or to another bus interface. The format of the data may or may not be altered, depending on the receiving functional unit.

Each frame of digital audio data may include data that corresponds to a particular audio channel. Accordingly, audio data corresponding to different channels may be transmitted to audio interface unit 21 in a time-division multiplexed manner. As noted above, DMA unit 26 may prefetch frames of digital audio data in an intended transmission sequence. Thus, using four-channel audio as an example, DMA unit 26 may first prefetch data corresponding to a first audio channel, followed by a second, a third, and finally a fourth, and subsequently repeating the cycle. These frames of digital audio data may be read out of buffer 28 and conveyed from multiplexer 27 in the same order in which they were prefetched.

Figure 3:
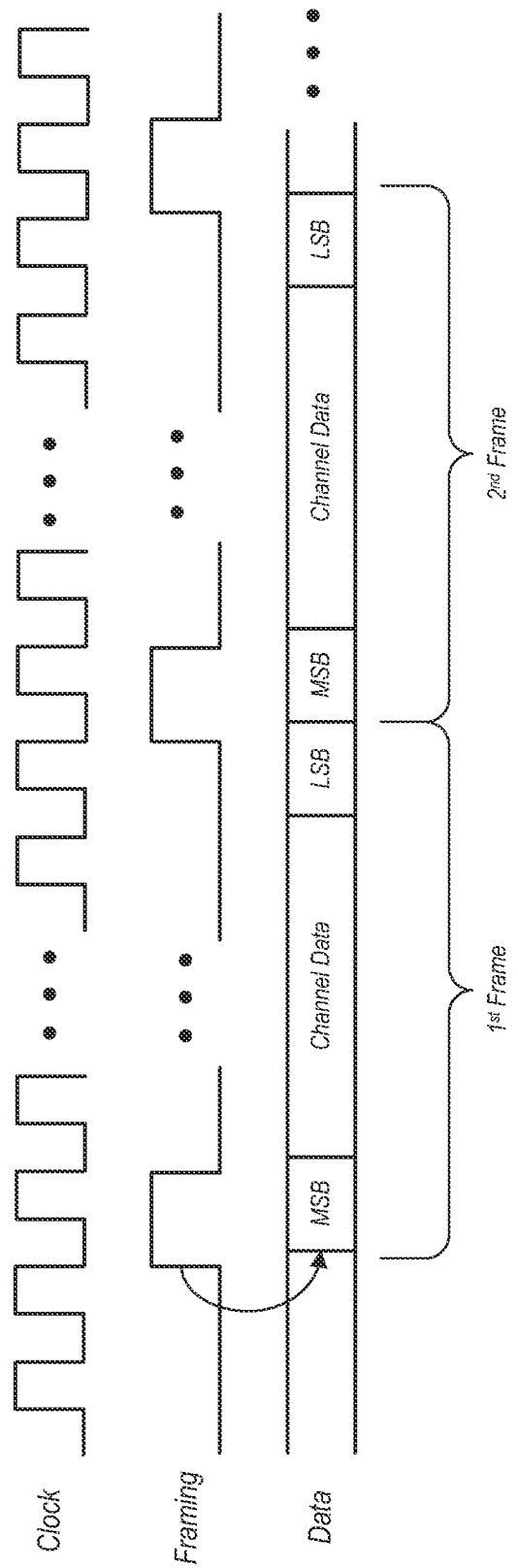
FIG. 3 is a timing diagram illustrating the transmission of data frames and operation in a zero-delay slave transmit mode.

Exemplary Timing Diagram and Method Flow:

FIG. 3 is a timing diagram illustrating the transmission of data frames and operation in a zero-delay slave transmit mode. The timing diagram also illustrates an exemplary frame format.

In the example shown, each frame includes a most significant bit, channel data (e.g., one or more channels of audio data) and a least significant bit. It is noted that embodiments of a frame having additional data (e.g., source data, destination data, and so on) are possible and contemplated. When a master device (e.g., audio interface 21) is ready to receive a next frame of data, it may assert the framing signal. A shown in the timing diagram of FIG. 3, the most significant bit of the first frame is transmitted responsive to the first shown assertion of the framing signal. Moreover, the most significant bit of the first frame is transmitted during the same clock cycle during which the assertion of the first framing signal is detected.

Subsequent to transmission of the first bit (e.g., the MSB) of the frame, the remaining bits thereof may be serially transmitted on subsequent cycles of the clock signal. In some embodiments, the subsequent bits may be synchronized to the rising edges of the clock signal, while in other embodiments the subsequent bits are synchronized to the falling edges. In general, any suitable synchronization scheme may be used.

When the master device detects the last bit of the frame (e.g., the least significant bit, or LSB in this example), it may be ready to begin receiving the next frame. Accordingly, responsive to receiving the last bit of a frame and before the rising edge of the next clock cycle, the master may again assert the framing signal. The slave device may again respond by conveying the first bit of the next frame on the same clock cycle in which assertion of the framing signal was detected. It is noted that the order of the MSB and LSB may be reversed in some embodiments, with the LSB being received first for each frame and the MSB indicating the end of the frame.

Each of the frames in the embodiment shown includes channel data as a payload. The number of channels of audio data within each frame may be any number suitable for the particular application. Channel data may be transmitted in a time-division multiplexed sequence within each frame, with first channel data followed in the payload by second channel data and so on, with the sequence repeating itself for each frame.

Figure 4:
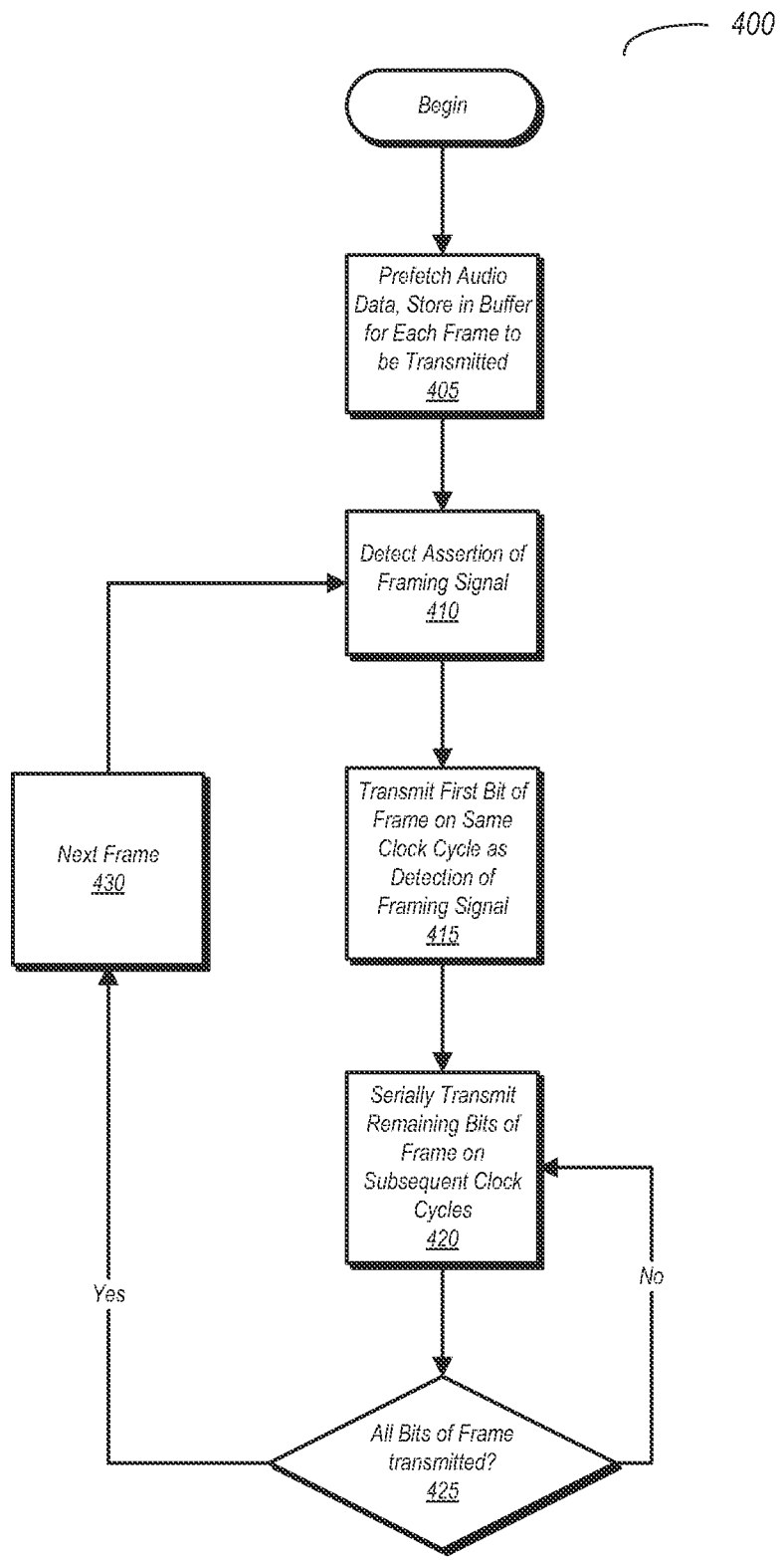
FIG. 4 is a flow diagram illustrating one embodiment of a method for transmitting data in a zero-delay slave transmit mode.

FIG. 4 is a flow diagram illustrating one embodiment of a method for transmitting data in a zero-delay slave transmit mode. In the embodiment shown, method 400 begins with the prefetching of each frame of data to be transmitted and the storing of that data in a buffer (block 405). The frames of data may be prefetched in order, and this may be ongoing, in parallel with the other portions of the method to be discussed herein.

During the operation, a master device may assert a framing signal, indicating it is ready to receive the next frame of data. A slave device may detect assertion of the framing signal (block 410). The framing signal may be asserted during one particular clock cycle and may be de-asserted prior to the next clock cycle. Responsive to detecting assertion of the framing signal, a first bit of the frame may be transmitted from the slave to the master on the same clock cycle of the detection (block 415). The remaining bits of the frame may be serially transmitted on subsequent cycles of the clock signal (block 420). If some of the bits of the frame have not yet been transmitted (block 425, no) then the serial transmission of bits may continue (block 420). Otherwise, if all bits of a frame have been transmitted (block 425), the method may advance to the next frame (block 430), and thus the master device may again assert the framing signal (block 410).

While the method and apparatus embodiments have been described above as transmitting/receiving audio data, it is noted that the disclosure is not intended to be limited as such. In general, the method an apparatus may apply to any data transmitted in a master-slave configuration in which data is transmitted from a slave to a master responsive to receiving a signal indicating that the master is ready to receive more data.

Figure 5:
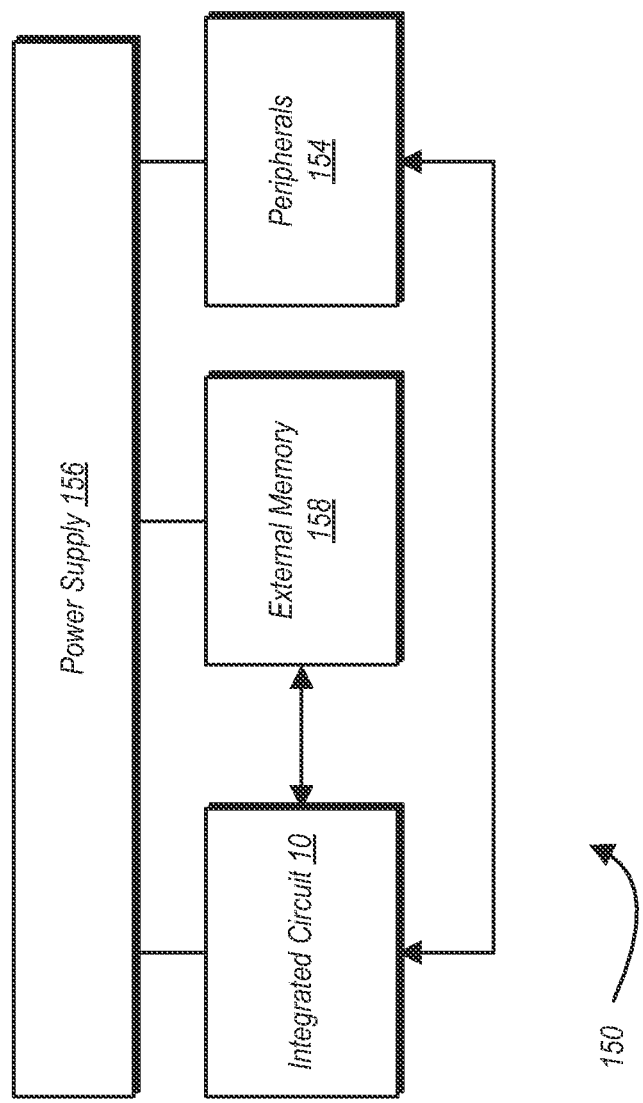
FIG. 5 is a block diagram of one embodiment of a system.

Exemplary System:

Turning next to FIG. 5, a block diagram of one embodiment of a system 150 is shown. In the illustrated embodiment, the system 150 includes at least one instance of an IC 10 (e.g., from FIG. 1) coupled to one or more peripherals 154 and an external memory 158. A power supply 156 is also provided which supplies the supply voltages to the IC 10 as well as one or more supply voltages to the memory 158 and/or the peripherals 154. In some embodiments, more than one instance of the IC 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
an asynchronous multiplexer;
a buffer coupled to first and second inputs of the asynchronous multiplexer; and
a control unit coupled to receive a framing signal and a clock signal from an audio interface unit, wherein the control unit is configured to prefetch digital audio data to be transmitted to the audio interface unit and to store the digital audio data into the buffer, wherein the control unit is further configured to, responsive to detecting an assertion of the framing signal during a given clock cycle, select an input of the asynchronous multiplexer to receive initial data of a frame of digital audio data to be transmitted to the audio interface from an output of the asynchronous multiplexer, and wherein the control unit is configured to cause the initial data of the frame of digital audio data to be transmitted to the audio interface during the given clock cycle.

2. The apparatus as recited in claim 1, wherein the control unit includes a frame detector configured to detect the assertion of the framing signal and configured to, responsive to detecting the assertion of the framing signal, change a state of a selection signal provided to the asynchronous multiplexer.

3. The apparatus as recited in claim 1, wherein the buffer is a first in, first out memory (FIFO).

4. The apparatus as recited in claim 3, wherein the FIFO includes a plurality of storage locations each configured to store a frame of data, and wherein the FIFO is configured to serially provide to the asynchronous multiplexer the frame of data stored in a given storage location.

5. The apparatus as recited in claim 1, wherein the control unit includes a memory control unit, wherein the memory control unit is configured to prefetch the digital audio data from a memory.

6. A method comprising:
a control unit prefetching audio data and storing the audio data into a buffer;
the control unit detecting an assertion of a framing signal;
the control unit selecting an input of an asynchronous multiplexer receive initial data of a frame of audio data responsive to detecting the assertion of the framing signal;
transmitting the initial data of the frame of audio data from an output of the asynchronous multiplexer to an audio interface unit during a same clock cycle in which the assertion of the framing signal was detected.

7. The method as recited in claim 6, further comprising:
an audio interface unit conveying the clock signal to the control unit; and
the audio interface unit conveying the framing signal to the control unit.

8. The method as recited in claim 6, further comprising transmitting subsequent bits of the frame of audio during subsequent cycles of the clock signal until each bit of the frame of audio data has been transmitted.

9. The method as recited in claim 6, further comprising transmitting a first frame of audio data corresponding to one or more audio channels and subsequently transmitting a second frame of audio data corresponding to the one or more audio channels.

10. The method as recited in claim 6, wherein the frame includes a plurality of bits, and wherein said transmitting comprises transmitting the plurality of bits serially.

11. An integrated circuit comprising:
a first functional unit configured to act as a master in a master-slave configuration, wherein the first functional unit is configured to convey a clock signal and a frame synchronization signal; and
a second functional unit configured to act as a slave in the master-slave configuration, wherein the second functional unit is configured to transmit digital audio data to the first functional unit;
wherein the second functional unit is configured to buffer prefetched digital audio data and, responsive to detecting an assertion of the frame synchronization signal, begin transmission of buffered digital audio data to the first functional unit during a same cycle of the clock signal in which assertion of the frame synchronization was detected.

12. The integrated circuit as recited in claim 11, wherein the integrated circuit further comprises a bus having first, second, and third signal lines coupled between the first and second functional units, wherein the first functional unit is configured to convey the clock and frame synchronization signals on the first and second signal lines, respectively, and wherein the second functional unit is configured to serially transmit the digital audio data to the first functional unit over the third signal line.

13. The integrated circuit as recited in claim 12, wherein the buffered digital audio is transferred as a frame, wherein a first bit of the frame to be transmitted is a most significant bit of the frame.

14. The integrated circuit as recited in claim 13, wherein the second functional unit is configured to transmit first and second frames of digital audio data consecutively, wherein the first and second frames each include digital audio data for one or more audio channels.

15. The integrated circuit as recited in claim 12, wherein the second functional unit includes:
an analog multiplexer having an output coupled to the third signal line;
a first in first out memory (FIFO) having first and second outputs coupled to first and second inputs of the analog multiplexer; and
a controller coupled to receive the clock signal and the frame synchronization signal, wherein the controller is configured to prefetch frames of digital audio data into the FIFO, and wherein the controller is further configured to, responsive to detecting assertion of the framing signal, select one of the first and second inputs of the analog multiplexer coupled to receive a next data frame to be transmitted from the FIFO.

16. A method comprising:
a master device conveying a clock signal to a slave device;
the slave device prefetching data into a first in, first out memory (FIFO);
the master device conveying an asserted framing signal to the slave device during a given cycle of the clock signal; and
the slave device causing transmitting a first bit of a first data frame back to the master device responsive to detecting the assertion of the framing signal, wherein said transmitting includes the slave device transmitting the first bit of the first data frame during the given cycle of the clock signal.

17. The method as recited in claim 16, further comprising the slave device serially transmitting remaining bits of the first data frame on subsequent cycles of the clock signal.

18. The method as recited in claim 17, further comprising the master device de-asserting the framing signal on a next clock cycle after asserting the framing signal, and further comprising the master device re-asserting the framing signal after all bits of the first data frame has been transmitted.

19. The method as recited in claim 18, further comprising the slave device transmitting a second data frame responsive to detecting the re-assertion of the framing signal.

20. The method as recited in claim 19, wherein the first data frame and second data frame each contain digital audio data, wherein the first and second data frames include data for a first audio channel and a second audio channel.

21. A system comprising:
an audio interface unit configured to convey a clock signal onto a first signal line of a bus and a framing signal onto a second line of the bus, wherein the audio interface unit includes a serial data input coupled to a third line of the bus; and
a data interface unit, the data interface unit including:
an analog multiplexer having an output coupled to the third line of the bus;
a buffer having first and second data outputs coupled to first and second inputs of the analog multiplexer, respectively; and
a control unit coupled to receive the clock signal and the framing signal from the audio interface, wherein the control unit is configured to prefetch frames of digital audio data and to store the frames of digital audio data in the buffer, and wherein the control unit is further configured to, responsive to detecting assertion of the framing signal, cause the multiplexer to select and transmit a next frame of data from the buffer to the audio interface unit during a same cycle of the clock signal in which assertion of the framing signal was detected.

22. The system as recited in claim 21, wherein the analog multiplexer is configured to transmit a most significant bit of the next data frame during the clock cycle in which assertion of the framing signal was detected, and wherein remaining bits of the next data frame are transmitted serially on subsequent cycles of the clock signal.

23. The system as recited in claim 21, wherein the analog multiplexer is configured to transmit a least significant bit of the next data frame during the clock cycle in which assertion of the framing signal was detected, and wherein remaining bits of the next data frame are transmitted serially on subsequent cycles of the clock signal.

* * * * *